Patented Aug. 26, 1930

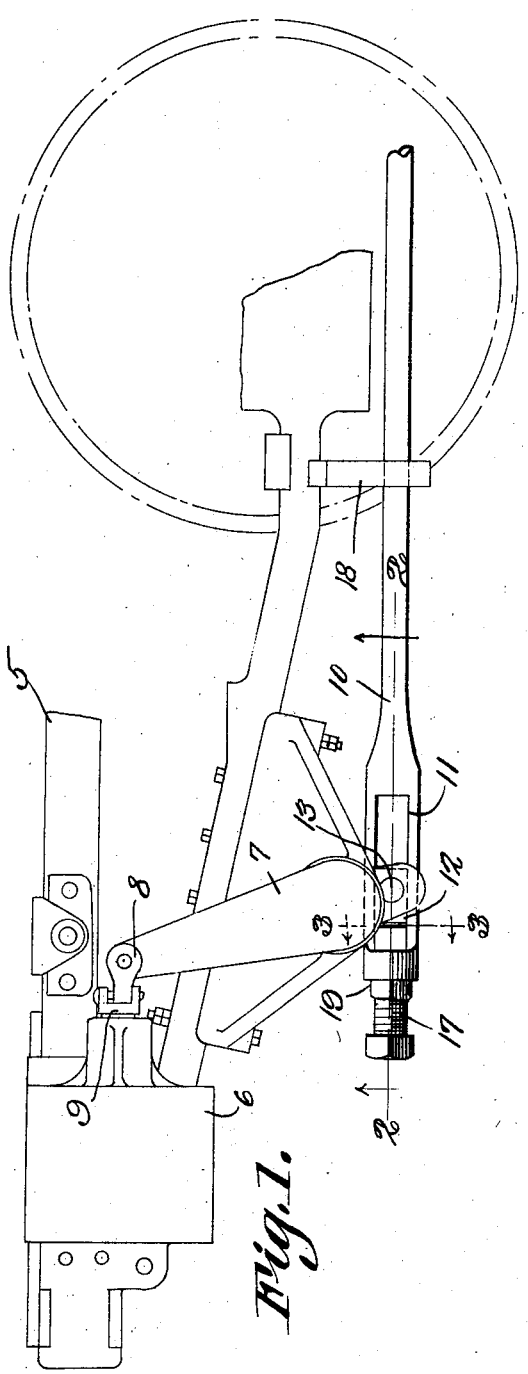

1,773,895

UNITED STATES PATENT OFFICE

JAMES F. VAN RIPER AND MITCHAEL MULLIGAN, OF SOUTH BROWNSVILLE, PENNSYLVANIA

ADJUSTABLE BRAKE ROD WITH REMOVABLE BUSHING

Application filed April 23, 1928. Serial No. 272,265.

This invention relates to brake rod construction, the primary object of the invention being to provide means whereby the brake rod for a locomotive may be readily and easily repaired when the threads in which the adjusting bolt of the brake rod operates, become stripped.

Another object of the invention is to provide a removable bushing to receive the threaded adjusting bolt so that when the threads become stripped, the bushing may be readily removed and replaced, thereby eliminating the necessity of discarding the brake rod to replace the damaged brake rod with a new one.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view illustrating a brake rod supplied with a removable bushing constructed in accordance with the invention.

Figure 2 is a sectional view taken on line 2—2 of Figure 1.

Figure 3 is a sectional view taken on line 3—3 of Figure 1.

Referring to the drawing in detail, the reference character 5 designates one of the beams of a locomotive frame, to which the brake cylinder 6 is connected, the brake cylinder being of the usual and well known construction, and connected with the brake lever through the links 8 and 9 respectively.

The reference character 10 designates the brake rod which is formed with an elongated opening 11 at one of its ends, in which the bearing member 12 moves, the bearing member 12 being connected with the brake lever 7 as by means of the bolt 13 that passes through the bearing 12.

In one end of the rod is an opening 14 designed to receive the extension 15 of the bushing 16 formed with internal threads to accommodate the adjusting bolt 17, that engages the bearing 12 to adjust the bearing when it is desired to adjust the throw of the brake rod or pull rod 10.

As shown, the rod 10 is supported in the usual and well known manner, the same resting in the hanger 18 so that movement of the rod will be accomplished without bending of the rod. A lock nut indicated at 19 is used in connection with the bolt 17 and acts to lock the bolt in its positions of adjustment.

From the foregoing it will be obvious that due to this construction the bushing may be readily and easily removed and replaced, should the bushing in use be rendered inoperative by reason of the threads being stripped.

We claim:

In a device of the character described, a brake rod having an elongated end portion formed with an opening, a brake lever, one end of the brake lever being positioned within the opening, a bushing having an extension defining shoulders, said bushing being positioned within the opening of the brake rod, the extension thereof extending into the opening of the enlarged end portion, the outer end of the extension lying flush with the outer surface of the enlarged end of the brake rod, an adjusting bolt extending through the bushing and engaging the brake lever to adjust the brake lever, a nut on the adjusting bolt and engaging the outer end of the extension and brake rod to hold the bushing and bolt in their active positions.

In testimony that we claim the foregoing as our own, we have hereto affixed our signatures.

JAMES F. VAN RIPER.
MITCHAEL MULLIGAN.